Nov. 19, 1968  K. G. F. SCHULZE ZUR WIESCHE ET AL  3,412,015
THIN FILM EVAPORATOR IN AN ADDUCTION PROCESS AND APPARATUS SYSTEM
Filed Aug. 9, 1965                                    3 Sheets-Sheet 1

INVENTORS:
KLAUS G. F. SCHULZE ZUR WIESCHE
PETRUS J. ANTONISSEN
WILLEM VAN DER BUNT

BY: Robert C. Clement
THEIR ATTORNEY

United States Patent Office 3,412,015
Patented Nov. 19, 1968

3,412,015
THIN FILM EVAPORATOR IN AN ADDUCTION PROCESS AND APPARATUS SYSTEM
Klaus G. F. Schulze zur Wiesche, Petrus J. Antonissen, Willem van der Bunt, The Hague, Netherlands, assignors to Shell Oil Company, New York, N.Y., a corporation of Delaware
Filed Aug. 9, 1965, Ser. No. 478,058
Claims priority, application Netherlands, Aug. 10, 1964, 6409163
24 Claims. (Cl. 208—308)

ABSTRACT OF THE DISCLOSURE

Separating organic liquids, at least one of which forms a solid adduct, by mixing the liquid with an adduct-forming compound and a volatile liquid, separating the solid adduct from the remaining liquid and introducing the adduct into a vertical cylindrical vessel containing conical baffles into which a hydrocarbon maintained at temperatures at least as high as the adduct-decomposition temperature is introduced tangentially to cause the adduct to decompose and the volatile liquid to vaporize from a thin film thereby avoiding clogging due to foaming. The disclosure also includes coating the conical baffles with material to which the adduct will not adhere and to the baffled vessel with tangential inlets in which the process is performed.

Figure 1:
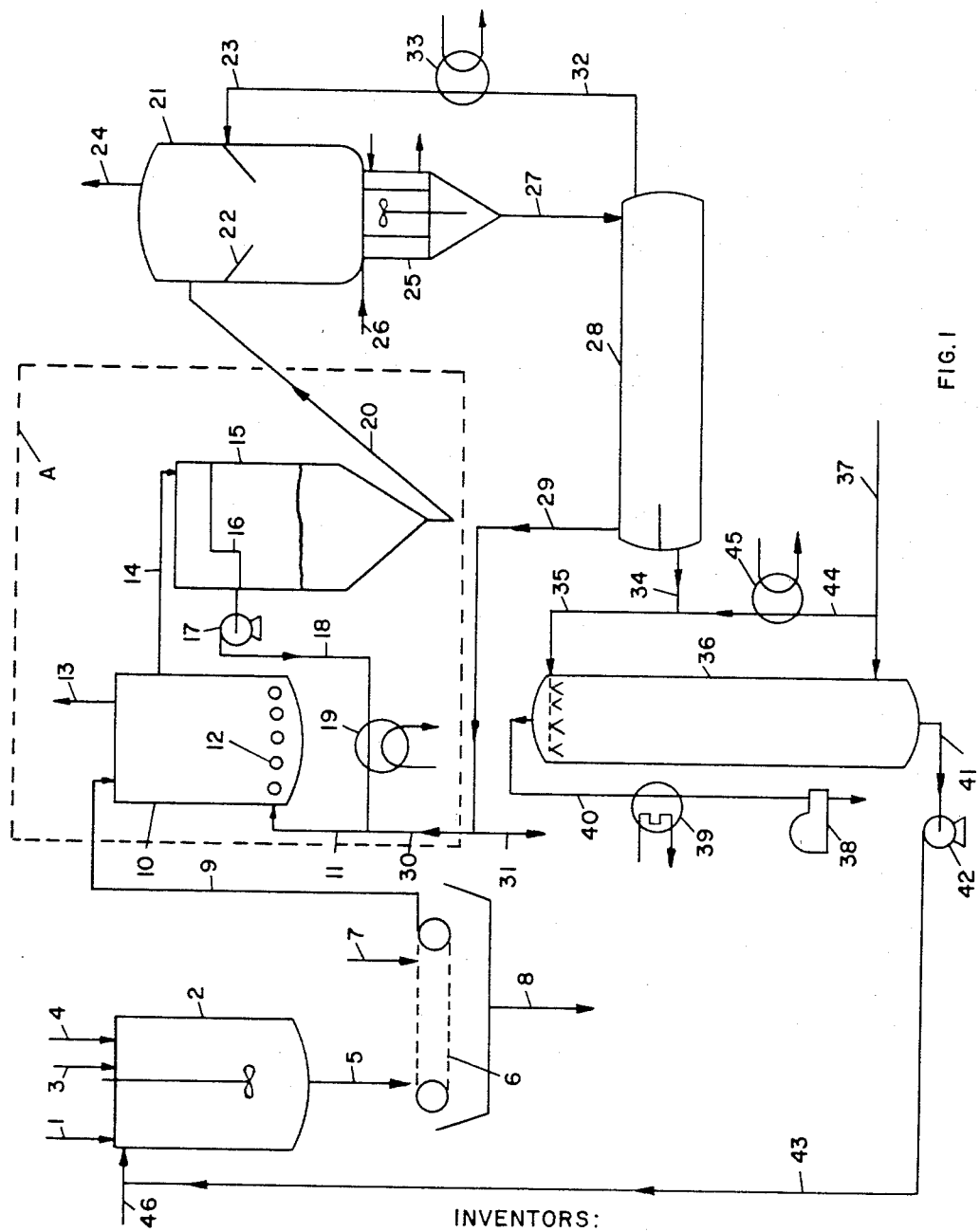

The invention relates to a process for the separation of a liquid mixture of organic compounds in the presence of (a) volatile compound(s) by bringing this mixture into contact with a material forming an adduct with at least one of the components of the mixture, after which the adducts formed are separated and subsequently decomposed while supplying heat.

In this process use may, in principle, suitably be made of any material capable of forming solid adducts with certain other substances. Known materials of this type are, for example, certain metal chlorides, such as $SbCl_3$, diamides of carbonic acid or its substitution products and compounds derived therefrom and the salts thereof. Urea and thiourea, either pure or impure, are particularly suitable for this purpose. Other materials promoting the formation of adducts may also be added. If it is desired to use the adducts-formers in solution, use may in principle be made of all types of known solvents employed for this purpose, such as water, polyhydric alcohols or the like.

The above-mentioned process may be applied to all types of mixtures, which, under the prevailing operating conditions, contain adduct-forming components in addition to components which do not form adducts or do so only to a lesser extent. These mixtures may, for example, contain hydrocarbons (unsubstituted or substituted in any manner), but they may also contain compounds other than hydrocarbons, such as, for example, alcohols, acids or the like. Suitable for treatment with urea or thiourea are, for example, mixtures which contain straight-chain compounds in addition to other compounds; when urea is employed, the former form adducts more readily and the latter less readily. When thiourea is used, exactly the reverse is true.

A process of the above-mentioned type is known, for example, from the Belgian patent specification 626,913, as well as from the German patent specification 1,000,951, from the latter patent specification in particular as a process for the separation of paraffins from hydrocarbon oils with the aid of urea as adduct-forming material.

The adduct-former or solution thereof, recovered in the decomposition of the adducts under the supply of heat are, in practice, often re-used in the process. This is also the case with any diluent and/or washing liquid supplied, with which the adduct formed has been treated after the separation of the mixture, and which supplied materials generally contain or consist of volatile components. If possible the heat still present in these auxiliary media or in one or more of the end products is usefully employed in the process by means of heat exchange with colder process streams from the process. The choice of the places where media circulating in the process are to be made up or renewed, as well as of the places where internal heat transmission will take place, depends on the operating conditions, and the above-mentioned process may, therefore, be carried out in various ways. Hence, the relevant process schemes will usually differ mutually, but these differences relate exclusively to details which aim at increasing the thermal yield, avoiding operational hold-ups or the like.

In all known processes of the above type, operational hold-ups may, however, occur which are due to clogging of the apparatus, either before or during the decomposition of the adducts formed, as a result of excessive foam formation or because of the adhesion of the adducts to the walls of the apparatus or lines. The object of the invention is to provide measures for the prevention of clogging caused in the manner indicated above.

According to the invention the measure for the prevention of clogging before or during the decomposition of the adducts consists in that the adducts, in order to be decomposed, are passed to an evaporating vessel in which they are mixed with a heat-transmission liquid tangentially supplied to the said vessel, the resulting suspension being passed in a thin layer over at least one downwardly-inclined surface of such a length that the volatile components are at least substantially removed from the suspension, after which the suspension is supplied to a heat-exchanger/decomposer in which the adduct decomposes into the adduct-former and the component or components with which the adduct is formed.

This measure ensures, in the first place, such a reduction in the thickness of the layer that volatile components can easily escape without causing excessive foam-formation which could lead to clogging. The tangential introduction of the heat-transmission medium at the same time sets up a rotation resulting in an increase in the distance to be covered and therefore in the residence time. In the second place, this measure makes it possible to increase the residence time at will, since at the end of the inclined surface, as a result of the rotation, the mixture is ejected again by the centrifugal force, so that one or more inclined surfaces may be added at will until the total residence time is sufficiently long to make it possible to guarantee a substantially complete removal of the volatile components. Owing to the absence of moving parts, operational stagnation caused by mechanical disturbances is, moreover, excluded.

The process according to the invention is in particular very suitable for the treatment of mixtures containing straight-chain hydrocarbons, especially straight-chain paraffinic hydrocarbons, in addition to other hydrocarbons, with urea and thiourea. In this case light hydrocarbons, such as butane, pentane or light gasoline fractions having a final boiling point of approximately 100° C., or the materials mentioned in the German patent specification No. 1,000,951, in particular dichloromethane, may for example, be used as diluent, although ketones, such as, for example, methyl ethyl ketone, may also be used. Moreover, the diluent, such as dichloromethane, may also be employed as washing agent for the adducts separated from the original mixture, before these adducts are decomposed in a subsequent step. As heat-transmission material for the pre-separation of the volatile components in the evaporating vessel paraffins are generally used; the inlet temperature is preferably not higher than 105° C., since at higher temperatures one or more of the individual components will decompose. The weight of the quantity of paraffins supplied per unit of time is preferably at least three times the weight of the quantity of adduct supplied.

The process according to the invention is carried out in an apparatus suitable for the purpose, which generally at least comprises a reaction vessel, a separating apparatus for adduct formed, a conveyor device for adduct, an evaporating vessel, a heat exchanger/decomposer and means for recycling recovered adduct-former to the reaction vessel.

In order to make it possible to execute the above-mentioned measures according to the invention, this apparatus is characterized in that the evaporating vessel is cylindrical with a vertical or substantially vertical centre line, is provided at the top with an inlet connected to the conveyor device for adduct in such a way that adduct is passed into the vessel at the side wall, that the vessel is provided at least at the top with a discharge line for volatile components in vapour form, and that on the side wall in the vessel beneath the adduct supply line at least one downwardly directed guiding surface is arranged in the form of a conical surface of a truncated cone, so that a central opening is left in the vessel, at least one tangentially directed inlet for heat-transmission liquid being arranged at the upper side of the conical surface of the cone in the side wall of the vessel.

Preferably a number of guiding surfaces are arranged above each other, a guiding partition being situated between each pair of guiding surfaces, the said guiding partition having the shape of a cone, if desired a truncated cone, widening towards the bottom.

Such a construction, therefore, enables the layer thickness of the material to be treated to be regulated in such a way that excessive foam-formation is avoided, while, moreover, the residence time in the evaporating vessel is sufficiently long to make possible complete or substantially complete removal of the volatile components. The size of the said passages is of course restricted within certain limits because the mixture of adduct and heating liquid must be able to pass therethrough, and also rising vapours consisting of volatile components must be able to find their way to the outlet(s) provided for this purpose, for example at the top of the evaporating vessel.

If there are several guiding surfaces situated above each other, each guiding surface is preferably provided on the upper side with at least one tangential supply for heat-transmission liquid. This makes it possible to keep the velocity of the mixture, consisting of adduct and heat-transmission liquid, in the direction of the periphery and thus the distance to be covered, sufficiently great to ensure the necessary residence time in the evaporating vessel.

To this end, according to the invention, a number of tangential supply lines for heat-transmission liquid are spaced at intervals around the periphery, the maximum supply capacity of at least a few of the said supplies being mutually different. This makes it possible to vary the quantity of heat-transmission medium without thereby necessarily entailing a change in the initial velocity in the evaporating vessel.

The angle of inclination of the guiding surfaces is preferably between 0° and 70°, calculated as the angle between a genetrix of the conical surface of the cone and the radius of the (imaginary) base of the cone. Angles of inclination between 30° and 50° are very suitable. The correct choice of the angle of inclination depends on the nature of the medium to be treated; if the angle chosen is too great, there exists a danger that the necessary residence time will not be attained owing to the strong gravitational influence.

In order to promote the passage of the liberated vapours, preferably at least one vent pipe is provided, which connects the space between a guiding surface and the wall of the vessel with the space within the conical guiding partition situated immediately below the said guiding surface. Such a vent pipe may be flattened, in such a way that the radial cross-section is greater than the peripheral cross-section so as to minimize the resistance relative to the main direction of flow of the media passing through.

Moreover, as mentioned above, the adhesion of adduct to the walls of the apparatus may result in clogging in the apparatus. According to the invention this drawback may be counteracted by lining the relevant portions of the wall of the equipment, such as the walls of the reactor and of the evaporating vessel, including the guiding surfaces and the like, with polymeric material containing fluorine or polymeric mixtures containing the said material.

The adhesion between adduct and synthetic materials of the above-mentioned composition has proved to be so slight that adhesion of adduct to the wall scarcely occurs. A difficulty in this case is the manner in which the lining material is secured to the relevant wall portions; for as far as known no securing agent has as yet been found which ensures a satisfactory adhesion between the lining material and the wall, so that eventually operational hold-ups reoccur.

The applicants have now discovered means which enable this drawback to be overcome as well. A first solution according to the invention comprises applying the lining material in the form of a film to the equipment or a portion thereof with the aid of a silicone-containing, resinous adhesive. By using this adhesive the degree of adhesion achieved is such that the film secured to the wall does not become detached even after a fairly prolonged period of time. If desired, the film may consist of perforated material; this also prevents the possible formation of blisters as a result of diffusion of volatile materials through the lining material.

Another solution according to the invention comprises applying the lining material in separate sheets to the equipment or a portion thereof, the edges of the sheets overlapping each other in such a way that an expansion joint is formed, and each sheet is centrally secured to the equipment. This fastening of each sheet may be effected by means of a draw bolt, screwed into the centre of a thickened portion of the sheet, the said draw-bolt co-operating with a bridge member connected to the equipment. This second solution is particularly suitable for use in that portion of the equipment in which the conical inclined surfaces are situated in the evaporating vessel, because this construction makes it possible to absorb, in a simple manner, changes in shape resulting from differences in temperature.

Figure 2:
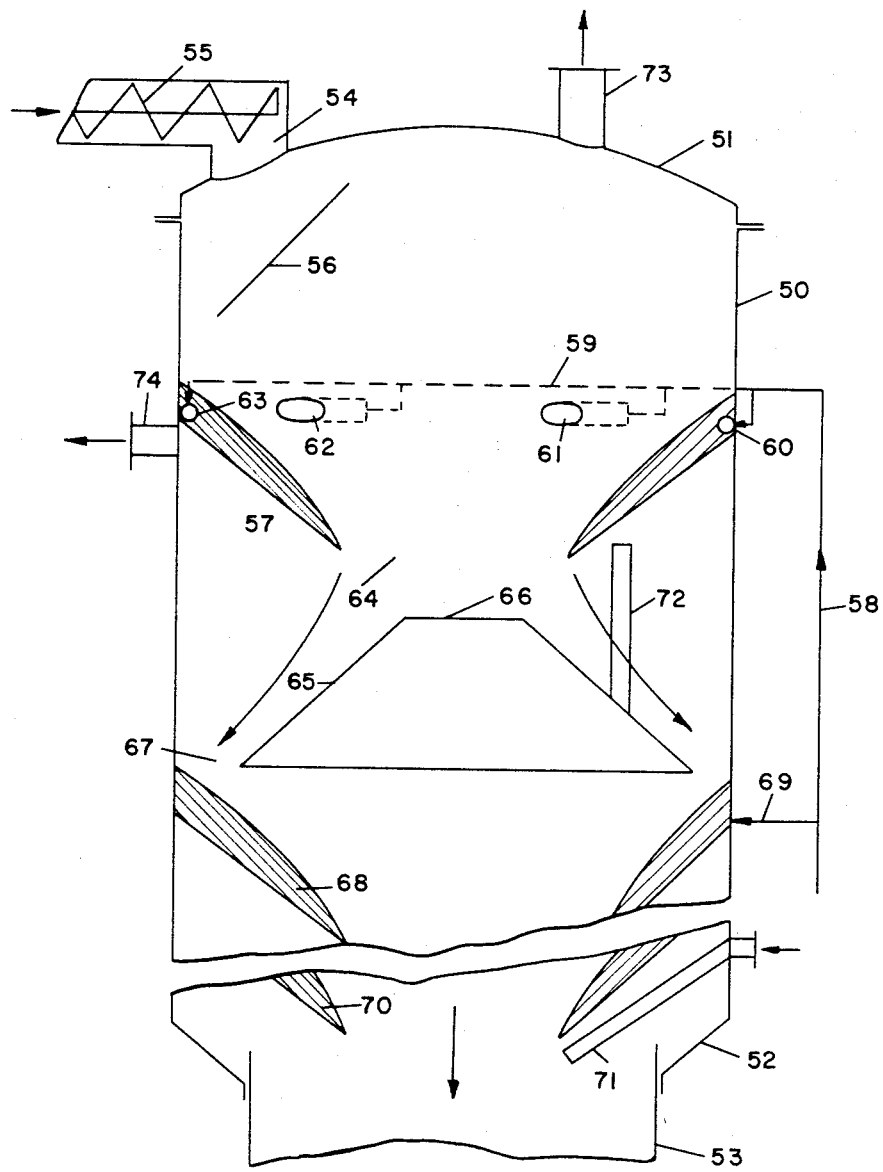
Figure 3:
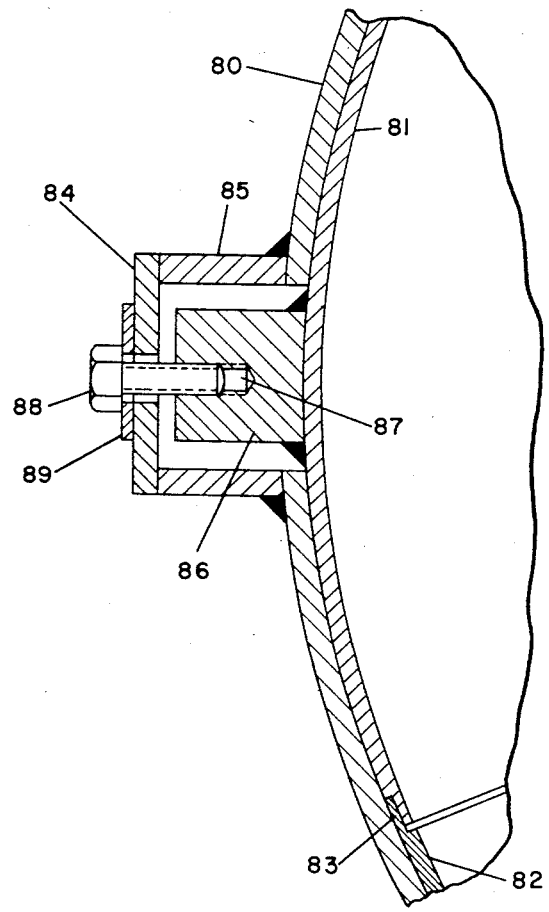

The invention will now be further illustrated with reference to the drawing, in which FIGURE 1 shows a portion of a flow diagram suitable for carrying out the process according to the invention, FIG. 2 shows a diagram of an evaporating vessel, of a design which is suitable for use in the present process, and, finally, FIGURE 3 shows a detail in which a suitable method of fastening lining material to the wall of the equipment is represented.

FIGURE 1 of the drawing shows a portion of a processing diagram according to an embodiment of the process according to the invention, viz, by way of example, the portion for the treatment of a hydrocarbon oil, containing paraffins, with the use of an aqueous solution of urea and dichloromethane as diluent. In this diagram pumps, valves, collecting vessels, instruments, and similar accessories have in general been omitted.

The oil is passed through a line 1 to a reaction zone 2 (in the case shown a stirred vessel), where it is contacted with an aqueous solution of urea introduced via a line 3 and further with dichloromethane introduced via a line 4. In the reaction zone 2 adduct-formation occurs between urea and paraffinic oil components; the resultant adduct-containing slurry is passed via a line 5 to an adduct separator 6 (in this case a screen belt filter). During separation the adducts are washed with dichloromethane supplied via a line 7, in order to remove oil adhering thereto.

The reaction zone could, if desired, be designed in another way and, for example, consist of several reactors in series; the adduct separator could also be designed in another way, for example as a centrifuge or in the form of a group consisting of several separators. The washing with dichloromethane may, of course, also be carried out on completion of the adduct separation.

The liquid remaining in the separator 6 after the adduct separation, is removed via a line 8 and may, if necessary, be subjected to a further treatment, for example for the removal of dichloromethane (not shown in the drawing). The washed adducts are led via a line 9 to a pre-evaporating vessel 10 in which already a part of the dichloromethane is pre-evaporated with the aid of paraffin as heating liquid, supplied via line 11, which issues in a number of outlet openings 12 incide the pre-evaporator 10. The temperature in this pre-evaporating vessel is kept at a low level, viz, at a level situated between that of the adduct formation, which is approximately 30° C., and the final decomposition temperature, which in this example is at least 85° C., but which may also be lower, this being dependent on the hydrocarbons to be treated (with lower hydrocarbons, for example, approx. 70° C.); a suitable temperature level is, for example, 50° C., at which temperature the evaporation of dichloromethane from the slurry still need not necessarily result in detrimental foam-formation. The liberated dichloromethane is discharged via a line 13. The remaining mixture is passed via a line 14 to a settler 15, from which settler the paraffin is recycled via an overflow gutter 16, a pump 17 and a line 18 to the supply line 11. On this route the paraffins also pass a heat exchanger 19, which may be operated by steam, and in which the paraffins are again brought to the required temperature. If in the pre-evaporator 10 significant foam-formation nevertheless takes place, the said evaporator should preferably be designed like the evaporating vessel 21 to be described hereinafter.

The adducts, which still contain a quantity of dichloromethane, are passed, via a suitable conveyor line 20, for example a conveyor screw, to the evaporating vessel 21, in which the remaining dichloromethane is removed from the adducts. In the evaporating vessel one or more inclined surfaces 22 are arranged, on the top side of which paraffin, as heat-transmission medium, is supplied to this vessel through a number of tangential supply-nozzles, which are connected to the supply line 23 for paraffin. Liberated dichloromethane is discharged via a line 24, and the adducts which have been substantially completely freed from dichloromethane are passed through a heat exchanger/decomposer 25, small quantities of water being added which are supplied via a line 26. The operation and design of the evaporating vessel 21 will be described later in more detail with reference to FIGURE 2.

The decomposition of solid adducts which has taken place in heat exchanger/decomposer 25, has resulted in a mixture containing paraffin and a solution of urea, and this mixture is passed via a line 27 to a separating vessel 28. From this vessel the paraffin is discharged via a line 29, whence a portion may, if necessary, be added to supply line 11 via the line 30 in order to make up the paraffin which is acting as heating medium, while another portion, in practice the main stream, is discharged as final product via a line 31. At the same time a portion of the paraffin separated in the separating vessel 28 may be passed via a line 32 through a heat exchanger 33 operated, for example, by steam, after which the said paraffin may subsequently be supplied to the evaporating vessel 21 via the line 23 in order to act as heat-transmission medium.

The urea solution separated in the separating vessel may of course be recycled directly to the reaction zone 2 and therefore be passed through a line to supply line 3 for the urea solution. It is, however, also possible to supply the urea solution via a line 34 and a line 35 to a mixing tower 36 kept under vacuum, to which at the same time the hydrocarbon feed is supplied via a line 37. The vacuum is maintained by means of a vacuum pump 38 and a cooler 39 connected to the tower 36 via a line 40. The vacuum to be maintained is approximately 30 mm. Hg. The advantage is that a mixture of urea solution and hydrocarbon feed can now be supplied from the said tower via a line 41, pump 42 and line 43 directly to the reaction zone 2, it being possible to use the heat present in the feed to give the aqueous solution of urea, diluted, inter alia, as a result of the quantity of water supplied via line 26, a sufficient concentration again.

A connecting line 44, with a heat exchanger 45, makes it possible to transfer a slip-stream of the feed to and mix it with the aqueous urea solution in line 35.

Since there is already a mixture of aqueous urea solution and feed in line 41, pump 42 and line 43, the formation of adduct is in principle already possible. Since in this case no dichloromethane is present as diluent, however, the said adduct formation in the said lines takes place extremely slowly; it goes no further than the formation of small nuclei, and this is in fact an advantage in respect of the necessary residence time in the reactor, which can then be relatively short. If urea solution and feed are premixed, it is, of course, not necessary to supply both these media to the reactor via the lines 1 and 3 respectively. The said supply lines in that case function as make-up lines during operation, or are used when the entire installation is put into operation and is filled with the various process media. It is, of course, also possible to add make-up feed or other process media at any other suitable point in the system. For example, a make-up line for the feed may be fitted by providing a line 46 which issues in the line 43 for the mixture stream of urea solution and feed.

The above-described flow diagram is of course one among many possibilities, in which elements and process stages which in the context of the present invention are of no importance, have been omitted. For example, no attention has been given to the further treatment of dichloromethane, which escapes from the lines 13 and 24 respectively; it is, for example, possible to use the heat energy present therein elsewhere in the process by exchange with another stream in the process.

It is also possible to simplify the flow-diagram discussed above. If the separating vessel 21 can be designed on the basis of the flow data in such a way that it can absorb the entire evaporation of dichloromethane as regards capacity, residence time and the like, the pre-evaporator 10 and the elements belonging thereto may be entirely omitted. This would involve the omission of that portion of the flow diagram enclosed within the area A indicated by a broken line, the conveyor lines 9 and 20 being in this case directly connected to each other.

The places where clogging may occur in the process, can as far as adhesion of adducts to the walls is concerned, of course only be situated at those points where adduct-formation or beginning of adduct-formation is possible, or where already formed adducts are present in the process stream. In principle this is thus possible in the tower 36, in so far as it concerns adduct nuclei possibly already formed at that point, and further in the reactor and all elements up to the decomposition of the adducts in the heat exchanger/decomposer 25. With regard to clogging caused by foam-formation, this danger already exists to a limited extent in the pre-evaporator 10, but most of all in the evaporating vessel 21. If in the pre-evaporator 10 there should be a danger of excessive foam-formation, then, as already indicated, a construction must be used corresponding to that of the evaporating vessel 21.

A more detailed exposition now follows of the measures for the prevention of clogging caused by foam-formation, and the relevant embodiment. For this purpose FIGURE 2, which shows a diagram of the evaporating vessel on a larger scale, should be consulted.

The evaporating vessel comprises a cylindrical wall 50, a cover 55 and a bottom portion 52, which is connected to the heat exchanger/decomposer 53 (the design of which is not shown). The adduct enters the evaporating vessel via inlet 54 and is supplied by means of a conveyor mechanism, for example, conveyor screw 55. In order to guide the adduct to the wall a guiding partition 56 is provided. It is, of course, also possible to arrange several such inlets around the periphery in the cover of the vessel. The adduct falls on to a conical surface 57, at the upper side of which hot paraffin is sprayed tangentially; this paraffin is supplied via a line 58 communicating with an annular line 59, which latter is provided with branches and communicates with spray nozzles 60, 61, 62 and 63. On the lower side of the conical surface 57 the mixture consisting of paraffin and adduct falls through the central opening 64 and spreads conically as a result of the movement in the direction of the periphery along the surface 57. The said mixture should arrive at or near the wall 50 on a subsequent inclined surface but, if the centrifugal force is not great enough, this object may be attained by the provision of a conical guiding partition 65.

By varying the quantity of paraffin and/or the inlet velocity of the paraffin, the thickness of the layer of the mixture on the conical surface may be varied as required, i.e. a layer-thickness may be attained which on the one hand guarantees sufficient residence time for the heat-transmission and on the other hand does not result in foam-formation. The guiding partition 65 chiefly functions when lower supply velocities are used, so that the centrifugal force is only slight; moreover, at lower speeds, the conical discharge of the mixture should be prevented from becoming so steep that the mixture reaches the wall 50 of the vessel at too low a point. The conical guiding partition 65 may extend outwardly so far that an annular opening 67 is retained which is large enough to provide sufficient passage to the media passing therethrough, i.e. the mixture of paraffin and adduct. Moreover, it should be possible for the liberated dichloromethane to escape in vapour form. To this end a central opening 66 may be provided in the conical guiding partition 65, which opening forms a passage for dichloromethane liberated in the lower part of the evaporating vessel. After the mixture has been recycled to the wall, it may be passed over a second conical surface 68, it being possible to arrange a number of spray nozzles for paraffin likewise on the upper side near the wall of the vessel (only indicated in the drawing by supply line 69).

The number of surfaces thus arranged above each other depends on the desired residence time and layer thickness, and more generally on the media which are treated in this way. The mixture of paraffin and adduct which has been freed from dichloromethane, leaves the evaporating vessel via the bottom surface 70 to be decomposed in the heat exchanger/decomposer 53. On the inlet side of the heat exchanger/decomposer there is a supply 71 for heated water. In order to promote the ascent of liberated dichloromethane one or more vent pipes 72 may be arranged, which connect the space beneath the conical surfaces with the central portion of the conical guiding partition, as a result of which the said vapours can find a way out via the said vent pipes through the central opening 66. Dichloromethane leaves the evaporating vessel in vapour form via outlet 73. It is also possible to provide individual outlets for dichloromethane beneath the conical surfaces, viz, near the top thereof, in the form as indicated by outlet 74. In that case vent pipes 72 are not necessary. In order to influence the flow of the media as little as possible the vent pipes, if present, may be flattened, in such a way that their peripheral cross-section is smaller than their radial cross-section.

The adduct which is supplied to the evaporating vessel is composed of unbranched paraffins, water and urea, there being moreover a quantity of dichloromethane mainly derived from the preceding scrubbing process; the quantity of dichloromethane still present in the adduct may be up to approximately 30% by weight based on the total weight of the dry adducts. The paraffin which is supplied in liquid form, has an inlet temperature of approximately 105° C.; the task of the paraffin is restricted to that of heat-transmitter. The maximum inlet temperature for the paraffin should be chosen with some care, inasmuch as a certain limit may not be exceeded in connection with possible decomposition of one or more of the components present in the mixture.

In practice the supply temperature of the paraffin is preferably lower than the allowable maximum temperature mentioned above; the choice of the said temperature depends, inter alia, on the temperature drop available for the total heat-transmission and the quantity of paraffin with which the adduct may be mixed. The total quantity of paraffin may be divided over the various cones, in such a way that on each cone a suitable layer thickness is obtained. This layer thickness is, inter alia, also dependent on the inlet velocity; in order to increase the possibility of control as much as posible the injection nozzles 60, 61, 62 and 63 each have a different diameter.

A suitable ratio between the quantity of supplied paraffin and the adducts present is, in a commercial unit, chosen in the order of magnitude of 3. If this ratio is raised, an unnecessarily large paraffin-circulation occurs, i.e. bigger pumps are then necessary and, therefore, more expensive equipment. Disturbances however, need not be expected when larger concentration ratios are used. If the above-mentioned ratio is chosen too small, the danger exists that insufficient heat-transmission takes place, as a result of which a portion of the dichloromethane would then still have to be evaporated in the heat exchanger/ decomposer 53.

With respect to clogging caused by caking of solid adduct to the walls of the equipment, it is possible to prevent this by lining the said walls with plastic material, in particular plastic material consisting of fluorine-containing polymer material or polymer mixtures containing this material. In the reactor, the pre-evaporating vessel, in short in those parts of the equipment having cylindrical walls, it is preferred to apply such lining material, with the aid of a suitable adhesive such as a silicone-containing, resin adhesive, as a film to the equipment or a portion thereof.

If non-cylindrical walls are used, for example, the conical portion of settling vessel 15 (vide FIGURE 1) or the internal structure of the evaporating vessel 21 (57, 65, 68, 70, in FIGURE 2), it is possible that the lining material, as a result of expansions or contractions caused by differences in temperature, does not adhere sufficiently well to the wall, despite the use of a suitable adhesive. In that case use is preferably made of lining material consisting of individual sheets, which are applied to the equipment or a portion thereof, such as, for example, polypropylene or another plastic material having a surface with non-adhesive properties. An example of such an application is shown in FIGURE 3. In this figure, 80 is a portion of the wall of the equipment, for example a portion of a conical surface forming part of the evaporating vessel. A lining material is secured to this wall in the form of sheets, a portion of a sheet 81 and a portion of a sheet 82 being shown in the figure, both these sheets overlapping each other by means of an expansion joint 83. A bridge member 84 and a wall portion 80 with which it co-operates by means of an annular member 85 welded to the said wall portion, together form a space, which may be filled with a thickened portion 86 welded to sheet 81. The thickened portion has in its centre a screw hole 87 into which a bolt 88 may be screwed, which forces the relevant sheet against the wall portion. Washer ring 89 may, if desired, be designed as a retaining ring.

It is, of course, also possible to provide non-conical wall portions with a lining in this way. Although this type of fastening is more expensive than the sticking of film on the relevant wall portions, this construction on the other hand has the advantage that replacement of sheet portions can be effected much more readily. The choice of the way in which the lining is secured depends, therefore, on the operating conditions.

The above-described process which is illustrated with reference to the separation of hydrocarbon mixtures with the aid of a urea solution as adduct-forming material is, of course, not restricted to this use. The process may be used whenever heat and/or material transmission between liquid and solid substance or possibly another liquid is necessary under particularly mild conditions, in which a possibility of controlling the amount of heat and/or layer thickness is desired. In addition, the possibility of using the invention for special mixing problems is not excluded.

What is claimed is:

1. A process for the separation of a liquid mixture of organic compounds in the presence of a volatile compound or volatile compounds by bringing this mixture into contact with a material forming an adduct with at least one of the components of the mixture, after which the adducts formed are separated and subsequently decomposed while supplying heat, characterized in that the adducts, in order to be decomposed, are passed to an evaporating vessel in which they are mixed with a heat-transmission liquid tangentially supplied to the said vessel, the resulting suspension being passed in a thin layer over at least one downwardly inclined surface of such a length that the volatile components are at least substantially removed from the suspension, after which the suspension is supplied to a heat exchanger/decomposer in which the adduct decomposes into the adduct-former and the component or components with which the adduct is formed.

2. A process as claimed in claim 1, characterized in that the mixture to be separated contains hydrocarbons, especially straight-chain paraffinic hydrocarbons, in addition to other hydrocarbons.

3. A process as claimed in claim 1, characterized in that urea or thiourea is used as adduct-former.

4. A process as claimed in claim 3, characterized in that an aqueous solution or a substantially aqueous solution of urea or thiourea is used.

5. A process as claimed in claim 1 characterized in that the mixture contains a volatile material as diluent.

6. A process as claimed in claim 5, characterized in that dichloromethane is used as volatile material.

7. A process as claimed in claim 5, characterized in that as volatile material a light hydrocarbon fraction having a final boiling point of not more than approximately 100° C. is used.

8. A process as claimed in claim 5 characterized in that the separation adduct is washed with diluent before the decomposition.

9. A process as claimed in claim 2 characterized in that straight-chain paraffinic hydrocarbons are used as heat-transmission material.

10. A process as claimed in claim 9, characterized in that the temperature of the paraffinic hydrocarbons on entering the evaporating vessel does not exceed 105° C.

11. A process as claimed in claim 8, characterized in that the weight of the quantity of paraffinic hydrocarbons supplied per unit of time is at least three times the weight of the quanity of adduct supplied.

12. An apparatus suitable for use in a process for separating a liquid mixture of organic compounds by formation of adducts with at least some of said compounds, which apparatus at least comprises a reaction vessel, a separating apparatus for adduct formed, a conveyor device for adduct, an evaporating vessel, a heat exchanger/decomposer and means for recycling recovered adduct former to the reaction vessel, characterized in that the evaporating vessel is cylindrical with a substantially vertical centre line, is provided at the top with an inlet line connected to the conveyor device for adduct in such a way that adduct is passed in to the vessel at the side wall, that the vessel is provided at least at the top with a discharge line for volatile components in vapour form, and that on the side wall in the vessel beneath the adduct supply line at least one downwardly directed guiding surface is arranged in the form of a conical surface of a truncated cone so that a central opening is left in the vessel, at least one tangentially directed supply for heat-transmission liquid being arranged at the upper side of the conical surface of the cone in the side wall of the vessel.

13. An apparatus as claimed in claim 12, characterized in that a number of guiding surfaces are arranged above each other, a guiding partition being situated between each pair of guiding surfaces, the said guiding partition having the shape of a cone, widening towards the bottom.

14. An apparatus as claimed in claim 13, characterized in that each guiding surface is provided on the upper side with at least one tangential supply line for heat-transmission liquid.

15. An apparatus as claimed in claim 12 characterized in that a number of tangential supply lines for heat-transmission liquid are spaced at intervals around the periphery, the maximum supply capacity of at least a few of the said supply lines being mutually different.

16. An apparatus as claimed in claim 12 characterized in that the angle of inclination of the guiding surfaces is between 0° and 70°, calculated as the angle between the genetrix of the conical surface of the cone and the radius of the base of the cone.

17. An apparatus as claimed in claim 16, characterized in that the angle of inclination is between 30° and 50°.

18. An apparatus as claimed in claim 13 characterized in that at least one vent pipe is provided, which connects the space between a guiding surface and the wall of the vessel with the space within the conical guiding partition situated immediately below the said guiding surface.

19. An apparatus as claimed in claim 18, characterized in that the vent pipe is flattened, in such a way that the radial cross-section is greater than the peripheral cross-section.

20. An apparatus as claimed in claim 12 characterized in that at least portions of the wall of the equipment, in particular the walls of the reactor and the evaporating vessel, including the guiding surfaces, are lined with polymeric material containing fluorine having a non-adhesive surface.

21. An apparatus as claimed in claim 20, characterized in that the lining material is applied in the form of a film on the equipment or a portion thereof with the aid of a silicone-containing, resinous adhesive.

22. An apparatus as claimed in claim 20, characterized in that the lining material is applied to the equipment or a portion thereof in separate sheets, the edges of the sheets overlapping each other in such a way that an expansion joint is formed, and each sheet is centrally secured to the equipment.

23. An apparatus as claimed in claim 22, characterized in that each sheet is secured by means of a draw bolt screwed into the centre of a thickened portion of the sheet, the said draw bolt co-operating with a bridge member connected to the equipment.

24. An apparatus as claimed in claim 22, characterized in that the lining material consists of polypropylene or polyethylene sheets.

References Cited

UNITED STATES PATENTS

| | | | |
|---|---|---|---|
| 2,284,623 | 6/1942 | Samans | 159—15 |
| 2,343,646 | 3/1944 | Dinley | 202—236 |
| 2,917,447 | 12/1959 | Hoppe et al. | 208—25 |
| 2,999,857 | 9/1961 | Hoppe | 260—96.5 |
| 3,110,646 | 11/1963 | Mayhew et al. | 159—49 |
| 3,117,923 | 1/1964 | Franz et al. | 208—25 |

DANIEL E. WYMAN, *Primary Examiner.*

P. E. KONOPKA, *Assistant Examiner.*